United States Patent [19]
Irani

[11] Patent Number: 5,421,410
[45] Date of Patent: Jun. 6, 1995

[54] PLUGGING OF UNDERGROUND STRATA TO ELIMINATE GAS AND WATER CONING DURING OIL PRODUCTION

[76] Inventor: Cyrus A. Irani, 7718 Stonesdale, Houston, Tex. 77095

[21] Appl. No.: 272,135

[22] Filed: Jul. 8, 1994

[51] Int. Cl.⁶ .................... E21B 33/138; E21B 43/32
[52] U.S. Cl. .................... 166/294; 523/130
[58] Field of Search ............ 166/294, 292, 300, 270, 166/268, 288, 305.1, 295; 523/130; 405/264

[56] References Cited

U.S. PATENT DOCUMENTS

| | | | |
|---|---|---|---|
| 4,130,165 | 12/1978 | Fast et al. | 166/294 X |
| 4,232,741 | 11/1980 | Richardson et al. | 166/292 X |
| 4,640,361 | 2/1987 | Smith et al. | 166/288 |
| 4,785,883 | 11/1988 | Hoskin et al. | 166/270 |
| 4,828,029 | 5/1989 | Irani | 166/268 |
| 4,844,163 | 7/1989 | Hazlett et al. | 166/270 |
| 4,856,588 | 8/1989 | Borchardt | 166/294 X |
| 4,899,817 | 2/1990 | Djabbarah | 166/252 |
| 4,903,767 | 2/1990 | Shu et al. | 166/270 |
| 4,913,235 | 4/1990 | Harris et al. | 166/273 |
| 4,921,576 | 5/1990 | Hurd | 166/252 |
| 4,945,989 | 8/1990 | Irani et al. | 166/268 |
| 4,945,990 | 8/1990 | Irani et al. | 166/268 |
| 4,947,933 | 8/1990 | Jones et al. | 166/263 |
| 5,095,984 | 3/1992 | Irani | 166/268 |
| 5,259,453 | 11/1993 | Johnston | 166/295 |

OTHER PUBLICATIONS

Cyrus A. Irani, "Transporting Mobility Control Agents to Thief Zones." Presented to the Society of Petroleum Engineers Permian Basin Oil and Gas Recovery Conference held in Midland, Tex. on Mar. 16–18, 1994.

*Primary Examiner*—Stephen J. Novosad
*Attorney, Agent, or Firm*—Pravel, Hewitt, Kimball & Krieger

[57] ABSTRACT

A process for plugging an underground strata to prevent coning, i.e. the intrusion into an oil production stream of gas located above an oil producing formation and/or water located below the formation from which the oil is being produced, by introducing a polymer or a surfactant together with a cosolvent into into a gaseous stream, e.g. carbon dioxide, in such ratio as to make the mixture just homogeneous when injected through the appropriate perforations into the zones above and below the oil bearing strata and yet subject to destabilization thereafter, either through some exiting feature of the reservoir such as temperature or the presence of water, or through some externally implemented event, such as a sudden lowering of the pressure in the vicinity of the well bore, to cause the polymer or surfactant to come out of solution and aid in plugging the zones through which vertical movement of gas and water, i.e. coning, had been taking place.

20 Claims, 1 Drawing Sheet

PLUGGING OF UNDERGROUND STRATA TO ELIMINATE GAS AND WATER CONING DURING OIL PRODUCTION

FIELD OF THE INVENTION

This invention relates to the plugging of underground formations in the vicinity of producing wells to alleviate the problems associated with gas and water coning caused by high oil drawdown rates. In particular, this invention relates to the transport of permeability reducing agents via a compressed gaseous solvent such as carbon dioxide or nitrogen or light hydrocarbons or mixtures thereof when injected into subterranean formations.

BACKGROUND OF THE INVENTION

Frequently, underground liquid hydrocarbon reservoirs are associated with gas caps which often serve the beneficial purpose of providing a drive mechanism for displacing the liquid hydrocarbon reserves to the surface through the production string. Gas caps can also form when oil production leads to a drop in reservoir pressure below the bubble point of the oil. Such gas caps are usually comprised of lighter hydrocarbons, primarily in the C1 through C10 carbon number range, and are present in a semi-equilibrium state with the bulk hydrocarbon liquids. Consequently, the actual composition of the gas cap will depend on the temperature and pressure of the reservoir and the composition of the liquid hydrocarbon phase in contact with the the gas cap.

It is not uncommon for the same liquid hydrocarbon reservoir to be in contact with a bottom water zone as well as a gas cap. Consequently, quite often a liquid hydrocarbon reservoir will be sandwiched between a gas cap above and a water zone below with both the gas and water capable of playing beneficial roles. For example, the expansion of the gas cap can be exploited to provide driving force for pushing the liquid hydrocarbons out of the underground reservoir. Similarly, if the water zone is being energized by an underground aquifer, then the energy of the aquifer and the density difference between water and hydrocarbon can be exploited to move liquid hydrocarbons out of the formation.

Understandably, there is a considerable incentive to recover the liquid hydrocarbons in the reservoir as quickly as possible in order to maximize the return on the original investment. Quick recovery usually requires a high drawdown rate. A high drawdown rate creates a high differential pressure between the producing well and the bulk reservoir, which in turn often leads to gas and water coning. Coning is a well condition in which the gas and water layers that bracket the oil zone start to flow toward the wellbore along vertical channels causing undesirable production of water and gas along with the desired hydrocarbon fluids. Once coning begins, increasing quantaties of water and gas are produced causing the ratio of produced oil to produced gas and or water to decrease. Once the cost of separating the produced oil from the produced water and/or gas exceeds the value of the oil, economics dictate shutting down the well.

Although numerous methods have been proposed and tried for restricting flow of gas and water into producing well perforations, none have been particularly successful. Such methods generally are directed to injecting some permeability reducing agent into the formation above and/or below the oil producing zones that would serve to restrict the flow of either gas or water to the producing perforations. Injected permeability reducing agents have always comprised a liquid phase carrying some viscosifying or gelling or cementing agent that serves to transform the injected phase into a thick barrier that limits the flow of gas or water to the oil producing perforations once the fluid has been put in place and the thickening mechanism activated.

Because the permeability reducing or plugging agent is introduced using a liquid phase transport medium, the accurate placement and in-depth propagation of the plug can be difficult. Additionally, once the plug has set, further treatment to abate gas or water coning at some later stage of production is difficult because it invariably requires corrective action beyond the existing plugged zone, while accessing this region is made difficult because of the presence of the original plug. Consequently, there is a need for a more flexible plug delivering mechanism which is capable of deeper penetration into the formation and does not suffer from the limitations of using a liquid phase.

My earlier patent, U.S. Pat. No. 5,095,984 offers a unique mechanism for in-depth delivery of a plugging agent to a high permeability thief zone using a compressed gas phase. This patent, incorporated herein by reference, basically teaches that any combination of compressed gas, cosolvent and polymer or surfactant that has been adjusted to be one phase at some specific temperature and pressure conditions, as defined by some specific application or reservoir properties, can be made to deliver the polymer or surfactant in a form that will plug an oil bearing formation if the temperature of the original mixture is raised or the pressure lowered from the conditions where the system has been made one phase.

SUMMARY OF THE INVENTION

This invention is directed to a method for preventing gas or water coning at a production well by delivery of either physical plugging or foam forming chemicals directly to the region adjoining the wellbore where the gas or water coning effect is being manifest. The method of this invention generally includes dissolving a plug generating agent in a compressed gas-like solvent phase transport medium to provide a homogeneous, single phase mixture to be directed through well perforations into channels through which coning is occurring. For aid in dissolution, cosolvents can be included in the transport medium. The invention further provides a mechanism for adjusting the composition of the single phase mixture such that it is maintained in its single phase only until the mixture encounters either a sufficient pressure change, or temperature change, from reservoir parameters or externally induced changes, or externally introduced destabilzing chemicals, such that the mixture becomes two phase with the plugging agent thereby made effective for plugging. Additionally, for use in solving water coning problems, a mixed cosolvent system having a secondary water soluble cosolvent can be used, which secondary cosolvent will be stripped out on contacting a water zone, thereby causing the mixture to become two phase and effectively delivering the plugging agent to the area of water coning.

DETAILED DESCRIPTION OF THE INVENTION

Figure 1:
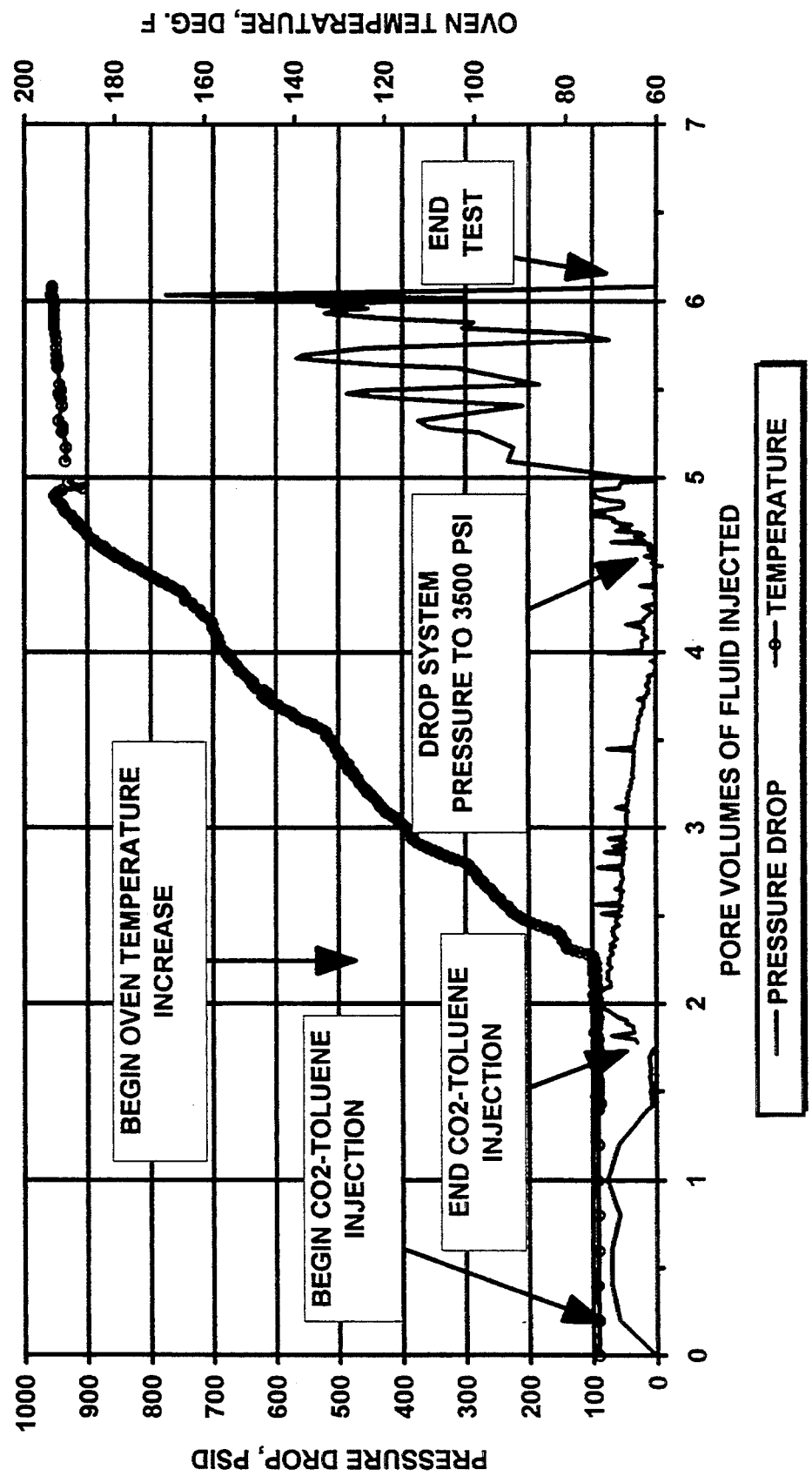

This invention deals with improving the performance of an oil producing operation wherein the efficiency of the process is hampered by the production of large volumes of gas or water from zones over or underlying the oil producing formation through a coning mechanism. This invention teaches a method for delivering a plugging or foam forming agent to the vicinity of the wellbore to hinder gas or water intrusion to the producing perforations. The most compelling advantage of this approach over the existing technology is that in the past the plugging agents had to be delivered by a liquid phase which limited the penetration and placement of the plugging mechanism. This invention uses a carrier gas to deliver the plugging mechanism, thus allowing for more flexibility in placement and penetration of the plugging agents.

A typical example of a primary carrier gas for delivering the plugging agent would be carbon dioxide, or nitrogen, or a mixture of light hydrocarbons, or air, or any combination of the above. Additionally, the cosolvent is any component intentionally added to the primary carrier gas phase that facilitates the dissolution of the solute (polymer or surfactant) into the primary carrier gas phase. Further to the purpose of this discussion, a surfactant is any component capable of concentrating at the interface separating immiscible phases. A detailed description of the role and interaction of miscible drive solvents, cosolvents and surfactants applicable to the teachings of this invention is presented in U.S. Pat. No. 4,828,029 which is incorporated herein by reference. U.S. Pat. No. 4,828,029 also teaches how the delivery of a surfactant to a high permeability zone improves the areal sweep of the miscible flood. The present invention compliments the invention in U.S. Pat. No. 4,828,029 by teaching a method that improves the delivery of surfactant to the region adjoining the wellbore of an oil producing well for the purpose of reducing gas or water coning.

Thus, this patent teaches the dissolution of surfactants or polymeric plugging agents into some carrier gas by exploiting as needed the use of a cosolvent to enhance solute miscibility, the concentration of cosolvent being adjusted to ensure that solute is just in solution in the carrier gas in the wellbore at the producing perforations, but immiscible when injected into the producing formation in the vicinity of the wellbore. The concentration of the cosolvent will be adjusted to accommodate the depth to which the mixture is required to penetrate before phase separation takes place and solute is deposited. The exact concentration of carrier gas, cosolvent and polymer will be adjusted in accordance with the anticipated phase behavior of the system as defined by the polymer type, reservoir temperature and pressure, and anticipated solute deposition mechanism. This information is readily obtained by undertaking the appropriate phase behavior studies to develop appropriate phase transition lines as identified in FIG. 1 presented in U.S. 5,095,984.

Whether or not a cosolvent is needed will be dictated by the particular application and the extent to which the carrier gas has been indirectly enriched with heavier hydrocarbon fractions that would be appropriate cosolvents. For example, if the primary carrier gas is carbon dioxide that has been enriched through contact with reservoir hydrocarbons during oil recovery operations, no additional cosolvent might be needed. It is even possible that some unique solute may be identified whose physical and chemical properties may be such that it may be directly soluble in a carrier gas such as carbon dioxide, methane or nitrogen, neither of which has been further enriched. The emphasis on cosolvents is an artifact dictated by the low solubility of most materials in straight carbon dioxide or methane or nitrogen, which would be the cheapest and most convenient carrier gas. The true emphasis of this patent is on exploiting a carrier gas to carry a solute into the vicinity of the wellbore of an oil producing formation where oil production is being affected by excess gas or water production due to a coning effect, and then exploiting either temperature or pressure or some chemical effect to drop the solute out of solution in the carrier gas to either physically or through foam formation, plug the parts of the formation through which gas and water coning is taking place.

EXAMPLE 1

The general workings of this invention can best be understood by the following example which describes an actual experiment which used this technology to plug a Berea core in a fashion similar to the plugging action that would be needed to stop gas coning in a reservoir environment. The one-inch-diameter 24-inch-long Berea core had an initial air permeability of 435 md and oil permeability of 245 md and was placed in a core-holder capable of sustaining high pressures. The entire assembly was further located in an oven so that the core's temperature could be raised as needed to demonstrate the working of the plugging mechanism.

For the purpose of this test the plugging composition was injected along the long axis of the core. Consequently, for practical purposes of interpretation, this core can be considered to duplicate a section of the reservoir adjoining the wellbore that needs to be plugged in order to constrain flow of gas towards the wellbore due to coning. It is considered a reasonable assumption that a core plugged in the longitudinal direction will also be plugged to the flow of gas in a direction perpendicular to the long axis.

The plugging solution prepared for the purpose of this demonstration used a 600,000 cst. viscosity polydimethylsiloxane polymer as the plugging agent, toluene as the cosolvent, and carbon dioxide ($CO_2$) as the carrier gas. The cosolvent concentration had been adjusted to ensure that the mixture would destabilize at approximately 160° F. and approximately 3500 psia pressure. The core was first continuously flushed with a mixture of toluene and carbon dioxide at 4000 psia and ambient temperature to minimize premature plugging of the core due to dilution effects when the plugging mixture was introduced. When stable flow of the plugging mixture through the core had been established, with the pressure maintained constant at 4000 psia, the oven was turned on and the temperature of the core slowly raised. When the oven temperature was above 160° F. the pressure of the core was deliberately lowered to 3500 psia to activate the plugging mechanism.

As illustrated in FIG. 1, the pressure response across the core was almost immediate, and within one-half pore volume of plugging mixture being injected differential pressures in excess of 200 psi were observed between the front face of the core and the first pressure tap located six inches from the front face of the core. The test had to be terminated after 1.5 pore volumes of plugging mixture had been injected because differential pressures exceeding 700 psi were being observed, and the core appeared to be on the verge of being completely plugged. This example clearly demonstrates the unique working of this invention, whereby a plugging agent carried entirely in the gas phase can effectively plug a reservoir rock so as to shutoff any further flow of typical reservoir or injected fluids through the plugged zone.

Furthermore, even though temperature is the primary destabilizing mechanism discussed in this example for delivering the plugging polymer, in no way should this be viewed as a limitation of the process. As discussed in the following examples, any number of alternate mechanisms such as pressure or the use of appropriate cosolvents will work. Neither should this example be construed to imply that only carbon dioxide is an adequate carrier gas for delivering the plugging polymer, because any of the combinations of components discussed above, adjusted as necessary with the appropriate choice and concentration of cosolvent will also suffice.

EXAMPLE 2

The specific workings of this invention can be best understood by the following example which explains how this invention can be used to plug off a zone adjoining a wellbore to prevent gas coning during oil production operations. Consider the case where a production well is at 140° F. and 3500 psi pressure and due to gas coning is showing an uneconomically high gas oil ratio (GOR). One option the operator has is to shut in the well for some period of time and then produce again at a slower rate. But during the time that the well is shut in there is no revenue due to oil production, and even though the initial GOR when the well is put back on production might be acceptable, invariably the GOR will climb steadily back into an unacceptable range. A more permanent solution to the gas coning problem as contained within the workings of this invention would be to prepare a mixture of carbon dioxide containing a cosolvent such as toluene and a high viscosity polymer such as 600,000 cs. polydimethylsiloxane polymer available from a number of industrial vendors. More specifically, if the starting temperature of the carbon dioxide phase is in the range of 100° F., and if the toluene concentration is approximately 9.6 vol. % and the polymer is present in 6 wt. % concentration, previous experience with these systems has shown that such a mixture will be one phase at 3500 psi and 100° F., and will stay one phase with increasing temperature up to about 130° F., but will become two phases with polymer dropping out of solution when the mixture temperature reaches 140° F.

For this invention to work with minimal damage to the oil producing zones, it is necessary that the producing well be packed off just below the uppermost producing perforations before the plugging mixture is injected. The packing off operation involves introducing a physical barrier called a packer which completely seals the wellbore in any horizontal plane where the packer has been placed so as to minimize communication between fluids injected above the packer and zones below the packer. Such an operation is quite commonplace in the oil industry, and anyone well versed in the art will be familiar with the operation without requiring any further elaboration.

With the packer in place, the above mentioned plugging fluid is injected into the producing well at a pressure higher than the formation pressure so as to cause it to flow down the production string and into the formation, entering the formation at the uppermost set of perforations left exposed by the appropriate placement of the packer. During the movement of the gas down the production string, the temperature can be expected to slowly increase, and when the mixture enters the reservoir the temperature will rapidly increase causing polymer to come out of solution and plug the surrounding formation. Understandably, sufficient amounts of this mixture will be injected to ensure that a volume surrounding the wellbore and extending out to a desired radius away from the wellbore is covered.

Even though the primary destabilizing mechanism here is temperature, it is not to be viewed as a limiting option. Rather, some other parameter like pressure could be used either independently or in conjunction with temperature to precipitate the polymer. For example, many of the oil fields in West Texas, New Mexico, etc. are low temperature, meaning that it is unlikely there will be any substantial temperature gradient between the producing well and the bulk formation. Consider for example a formation where the pressure is 3500 psi but the temperature is only 100° F., which is the same as that of the available carbon dioxide carrier gas. For the working of this invention it is only necessary to adjust the cosolvent to say 7.5 vol. % which will be sufficient to put the polymer into solution, and then inject this mixture into the top perforation. Once the mixture is in the reservoir, and with the packer still in place, the producing well can be opened up to production to a high drawdown rate, which will cause the pressure in the formation surrounding the wellbore to drop rapidly. Once the pressure falls 200 or 300 psi below the mixture stabilizing pressure, the polymer rapidly drops out of solution and plugs the formation in the vicinity of the wellbore.

Still another approach would exploit the dilution available through mixing of the injected plugging composition with the reservoir gas that is responsible for the coning problem. Thus, for example, if a cosolvent is exploited to put the plugging agent into solution in the carrier gas, any mechanism that will strip the cosolvent out will destabilize the system and drop out the plugging agent. For this mechanism to work it would be appropriate to use the top perforations in the production string, i.e. those perforations most vulnerable to early gas intrusion. It might even prove more effective if production from the well were curtailed for some time to allow oil to rise up to the highest level in the producing zone. Another improvement would be to pack off above the highest perforations and penetrate the formation with a new set of perforations through which the plugging solution would now be introduced, following which the new perforations could be plugged with cement, the packer removed and the well put back on production at a high rate. The intent of all these modifications being to locate a slug of the plugging composition in a wide radius around the wellbore just at the gas oil contact where the first effects of gas coning will be manifest.

Putting the well back on a high rate of production will instantly induce the offending gas to channel through and dilute the plugging mixture, stripping out the cosolvent in the process and forcing a precipitation of the plugging component. Thus, in addition to temperature and pressure, a straight dilution effect can be equally effective for depositing the plugging agent and preventing further gas coning. Additionally, even though carbon dioxide has been singled out as the carrier gas in the example, this choice does not represent a limitation, as any of the carrier gases discussed earlier, including whatever is readily and most economically available will be equally effective for the working of this invention.

EXAMPLE 3

This example will demonstrate how a feature of this invention can be used in conjunction with the water phase usually located under the oil column, and which is equally capable of coning upwards to be produced in large volumes to make the water/oil ratio (WOR) uneconomical. Most of the reservoir parameters presented in the above example still hold, with one significant exception. For this application it is necessary that the packer be placed just above the lowest perforations as it is now necessary to inject the plugging agent under the oil producing zone. This is achieved by delivering the mixture to be injected down a tubing string that can stab through the packer to deliver the mixture below the packer and directly to the part of the formation where water coning is taking place.

All the features and mechanisms of the invention discussed in Example 2 apply again. However, if some fraction, up to 50 volume percent of the toluene type cosolvent is replaced by a strongly water soluble cosolvent like acetone, then when the injected mixture encounters the water phase, the water will strip out the acetone destabilizing the system and plugging the zone with deposited polymer. In a fashion similar to that described in Example 2 above it might be appropriate to shut in the well for a period of time to allow the oil/water interface to stabilize. If the plugging mixture is now introduced into the lowest existing perforations, and these perforations packed off before opening the well up at high rates, the encroaching water will mix with the plugging solution, strip out the water soluble cosolvent, and deliver the plugging agent.

The foregoing disclosure and description of the invention are illustrative and explanatory thereof, and various changes in the materials and procedure may be made without departing from the spirit of the invention, the scope of which is defined by the following claims.

What is claimed is:

1. An improved method for preventing gas or water production during the recovery of oil from a subterranean, hydrocarbon-bearing formation which is penetrated by at least one production well, wherein a non-aqueous displacement fluid is injected into said formation through selected perforations in said production well and fluids are produced from said production well, the improvement comprising dissolving in said non-aqueous displacement fluid an effective amount of a solute prior to injecting said fluid into said formation through said selected perforations, injecting said fluid into said formation through said perforations, and lowering the solubility of the solute in the formation in the vicinity of the well bore, thereby causing the solute to drop out of solution in said formation to plug the formation in the vicinity of the well bore.

2. The method of claim 1, wherein the solubility of the solute in the injected fluid is lowered by a change in the temperature of the injected fluid as it penetrates into the formation.

3. The method of claim 1, wherein the solubility of the solute of the injected fluid is lowered by lowering the pressure of the formation in the vicinity of the well bore.

4. The method of claim 3 wherein the formation pressure in the vicinity of the well bore is lowered by opening up production to a high drawdown rate.

5. The method of claim 1 wherein the displacement fluid is a mixture of light hydrocarbons ranging in carbon number between 1 and 15.

6. The method of claim 1 wherein the displacement fluid is comprised of mixtures of carbon dioxide and light hydrocarbons ranging in carbon number between 1 and 15.

7. The method of claim 1 wherein the displacement fluid is comprised of a mixture of carbon dioxide, nitrogen and light hydrocarbons ranging in carbon number from 1 to 15.

8. The method of claim 1 wherein the solute is a surfactant.

9. The method of claim 8 wherein the surfactant is in the HLB range between 0 and 10.

10. The method of claim 8 wherein the surfactant is in the HLB range between 10 and 20.

11. The method of claim 1 wherein the solute is a polymer.

12. The method of claim 11 wherein the polymer is a member of the polydimethyl siloxane family.

13. The method of claim 1 wherein the solute is a member of the glycol family.

14. The method of claim 1, further comprising adding a cosolvent to the non-aqueous displacement fluid prior to injection to assist in solubilizing the solute in the displacement fluid under injection conditions.

15. The method of claim 14 wherein the concentration of the cosolvent is adjusted such that the solute is solubilized in the displacement fluid under injection conditions of temperature and pressure but is substantially insoluble in the displacing fluid at the formation temperature and pressure.

16. The method of claim 14 wherein the cosolvent is a hydrocarbon ranging in carbon number from $C_2$ to $C_{30}$.

17. The method of claim 14 wherein the cosolvent is a mixture of hydrocarbons derived from available crude oil fractions.

18. The method of claim 14, wherein up to 60 vol. % of the cosolvent is water soluble.

19. The method of claim 18, wherein the water soluble cosolvent is acetone.

20. The method of claim 1 wherein the selected perforations for injecting displacement fluid are perforations in the vicinity of the formation where coning has occurred.

* * * * *